FIG. I

Aug. 16, 1949.  L. HANSON  2,479,236
SHAFT SEAL ARRANGEMENT
Filed Sept. 22, 1944  3 Sheets-Sheet 2

INVENTOR.
Lars Hanson
BY Herman Feis

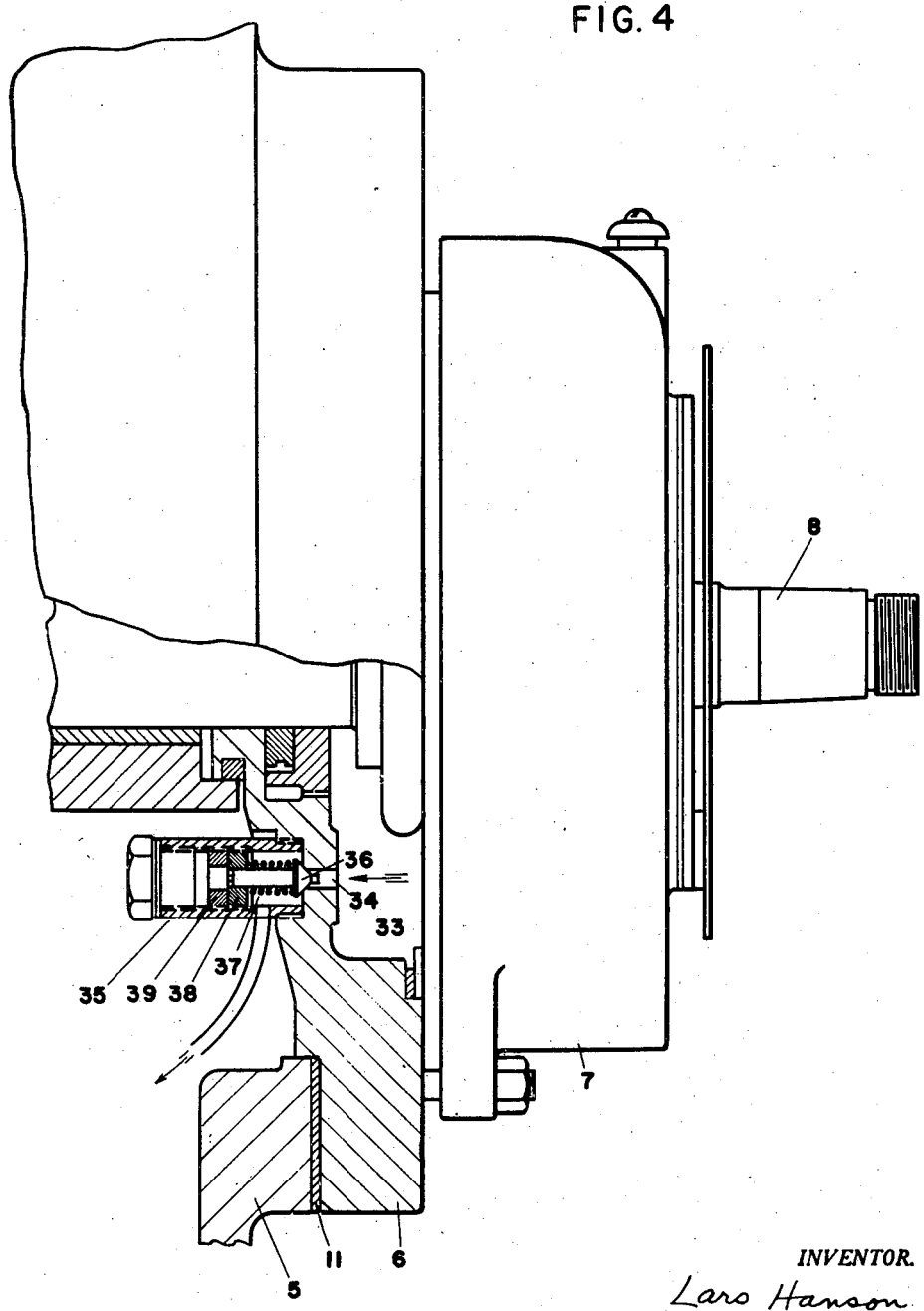

Patented Aug. 16, 1949

2,479,236

UNITED STATES PATENT OFFICE 2,479,236

SHAFT SEAL ARRANGEMENT

Lars Hanson, Syracuse, N. Y., assignor to Carrier Corporation, Syracuse, N. Y., a corporation of Delaware Application September 22, 1944, Serial No. 555,284

10 Claims. (Cl. 286—9)

This invention relates to the sealing of shafts and more particularly to new and novel means for assuring a seal about a moving shaft employed in a refrigerant compressor.

The principal object of the invention is to provide a simple, inexpensive, and substantially foolproof seal arrangement for use in a refrigerant compressor, where an oil seal may be maintained, regardless of the type of refrigerant employed, and with uniform conditions maintained at all points of the seal.

A feature of the invention resides in the provision of a moving assembly of parts forming a seal about a refrigerant compressor shaft in combination with means for assuring a uniform flow of oil about all points of the seal to provide a relatively cool bath of sealing fluid, assuring the maintenance of a uniform temperature at all sealing points.

Another feature of the invention resides in the provision of a sealing sleeve frictionally engaging a sealing element mounted on and rotating with a shaft, plus an annular oil feeding device for flooding with oil all points of contact between said sleeve and element, a slight amount of oil passing therebetween.

Another feature of the invention resides in the provision of a sleeve spring pressed against a sealing element, said sleeve being spaced from a collar mounted on the shaft. Means are provided for supplying uniform flow of oil between the sleeve and collar, with an infinitesimal portion feeding through the space between the sleeve and collar.

Another feature covers the use of a plurality of elements mounted about and rotating with a shaft in combination with a spring maintaining pressure against one of the moving elements plus a flow of oil between said moving element and a substantially stationary element.

Another feature resides in the use of sealing elements mounted about and rotating with a shaft in combination with a stationary element adapted to self-align itself to assure intimate contact in a sealing area between said element and one of the moving elements.

Another feature covers the use of a rubber-like ring positioned about a sealing sleeve which, in turn, abuts a moving sealing element mounted on a rotating shaft. Said ring has compressible and flexible characteristics for maintaining a seal about said sleeve and for enabling said sleeve to align itself regardless of any irregularity in shaft rotation to assure sealing contact between the sleeve and the element against which it abuts.

Another feature resides in placing a rubber-like ring in juxtaposition to an end element of a compressor, said ring being mounted about a sealing sleeve in such manner that a seal is maintained between the ring and sleeve regardless of shaft end play causing a movement of a sleeve.

Another feature covers the use of a sealing ring, incorporating carbon or graphite for imparting self-lubricating properties thereto, said ring being positioned between a rotating sealing element on the shaft and a stationary sleeve spaced from the shaft. Means for flooding oil about all points of said ring assures a fluid sealing film at both sides of the rings between the ring and said rotating and stationary elements.

Another feature covers the provision of means for assuring the maintenance of a desired oil pressure in the chamber enveloping applicant's sealing arrangement for maintaining the passage of a slight amount of oil in a desired direction between a plurailty of sealing elements.

These and other features will be more apparent from the following description of typical forms of the invention to be read in connection with the accompanying drawings in which.

Figure 3:
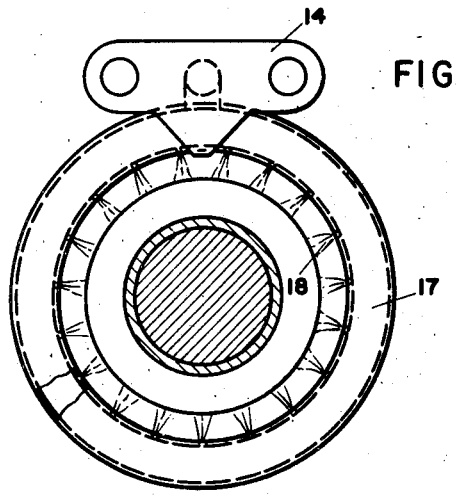

Fig. 3 is a detailed view of applicant's spray and distribution element for assuring supply of lubricant at all points of a seal; and Fig. 4 is a diagrammatic representation of one end of a compressor in which applicant's sealing arrangement may be incorporated together with a means for assuring the maintenance of a desired oil pressure in the sealing chamber, regardless of the existence of a different pressure in the crank case or impeller section of a compressor or pump to which the invention may be applied.

Considering the drawings, similar designations referring to similar parts, numeral 5 designates a casting of a compressor to which is suitably secured seal housing section 6. End section 7 is suitably affixed to seal housing section 6.

A shaft 8 serving a refrigerant compressor, or the like, to which the invention may be applied, is part of a compressor or pump assembly, the various elements of which are not shown since they form no part of the invention which is confined to the provision of a sealing means at one end thereof. The shaft extends through bearing housing 9 and projects within the seal housing section. The sections, at their points of juncture, are provided with suitable oil seals 10 and gaskets 11 in the usual manner. Labyrinth seal 12 is provided with a suitable opening for permitting passage of a measured quantity of oil to the bearing housing.

The end section 7 has affixed thereto at its outside extremity a labyrinth section 13 and is suitably provided with gaskets at its point of juncture with connecting elements to provide a leak-proof enclosure.

Within the end section and secured to the seal housing section 6 is a manifold 14, held to section 6 by bolts 15. The manifold delivers oil supplied through passage 16 to an annular distributor 17 attached to the manifold.

As shown in Fig. 3, the distributor 17 is a tubular structure adapted to surround shaft 8. It is connected to manifold 14 which, in turn, is secured to housing section 6. The oil from the manifold is discharged in a plurality of sprays at the points 18 so that a flood of oil is provided about all points of an annular sealing arrangement positioned within the distributor about the shaft.

Considering the sealing arrangement, sealing ring 19 is fitted about the shaft abutting against the shoulder at the point where the shaft is reduced at the entering end of the seal. A collar 20 abuts the sealing ring and is maintained in desired frictional engagement by nut 21. A sleeve 22 concentrically positioned with respect to collar 20 is spaced therefrom and has a sealing end, as shown, in engagement with a face of sealing ring 19. Stationary securing element 23 is held to the end section 7 by bolts or the like 24. Element 23 is suitably formed to accommodate a rubber-like sealing ring 25 which abuts gland 26, with spring 27 maintaining pressure between the gland and the abutting end of sleeve 22. As a result, a tight sealing surface is provided between the contacting face of rotatable sealing ring 19 and that of the non-rotating sleeve 22.

Under practical operating conditions, a pump not shown will supply oil through supply opening 28 which will feed through passage 16 into the manifold 14 and be sprayed in the manner shown in Fig. 3, to the seal surface provided between ring 19 and the sleeve 22. The annular ring thus assures a continuous and ample supply of lubricant substantially at all points of the seal, with the result that the contacting faces have a continuous and unbroken film of oil invariably maintained.

The flow of oil at all points of the sealing area not only assures the maintenance of the desired sealing film between the contacting faces, but provides the desired safe temperature at the sealing surfaces, despite the friction produced by the rotation of sealing ring 19 in engagement with the abutting face of sleeve 22.

The great advantage resulting from this arrangement is that the uniform supply of oil at all points of the seal results in a uniform temperature at all points of the seal where the contacting surfaces are in engagement. In consequence, substantially equal wear takes place, although this is negligible, and the uniform temperature makes for preservation of the flat surfaces which are preserved in close contacting condition over long periods of time.

A slight amount of oil will pass between the contacting faces and seep through the annular passage 29, as shown between the sleeve and collar, emerging in slight amount at the end of the shaft, dropping into collecting chamber 30 from which it is returned through passage 31 for reuse.

Figure 2:
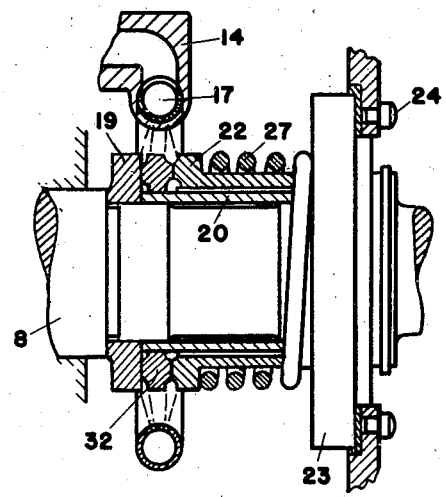
Fig. 2 is a fragmentary view, partially in section, showing a modified form of applicant's sealing arrangement.

In Fig. 2, applicant shows a modified form of his sealing arrangement in which an auxiliary sealing ring 32 is positioned between rotating ring 19 and the sealing face of non-rotating sleeve 22. Ring 32 may be of bronze or other suitable material or may contain carbon, graphite or similar materials imparting self-lubricating properties thereto. The discharge of oil from annular distributor 17 will be through a double series of orifices surrounding ring 32, with the result that a first sealing film will be maintained between the rotating sealing ring and ring 32 with a second sealing film maintained between the frictionally engaging faces of the sealing ring 32 and abutting face of non-rotating sleeve 22.

Figure 1:
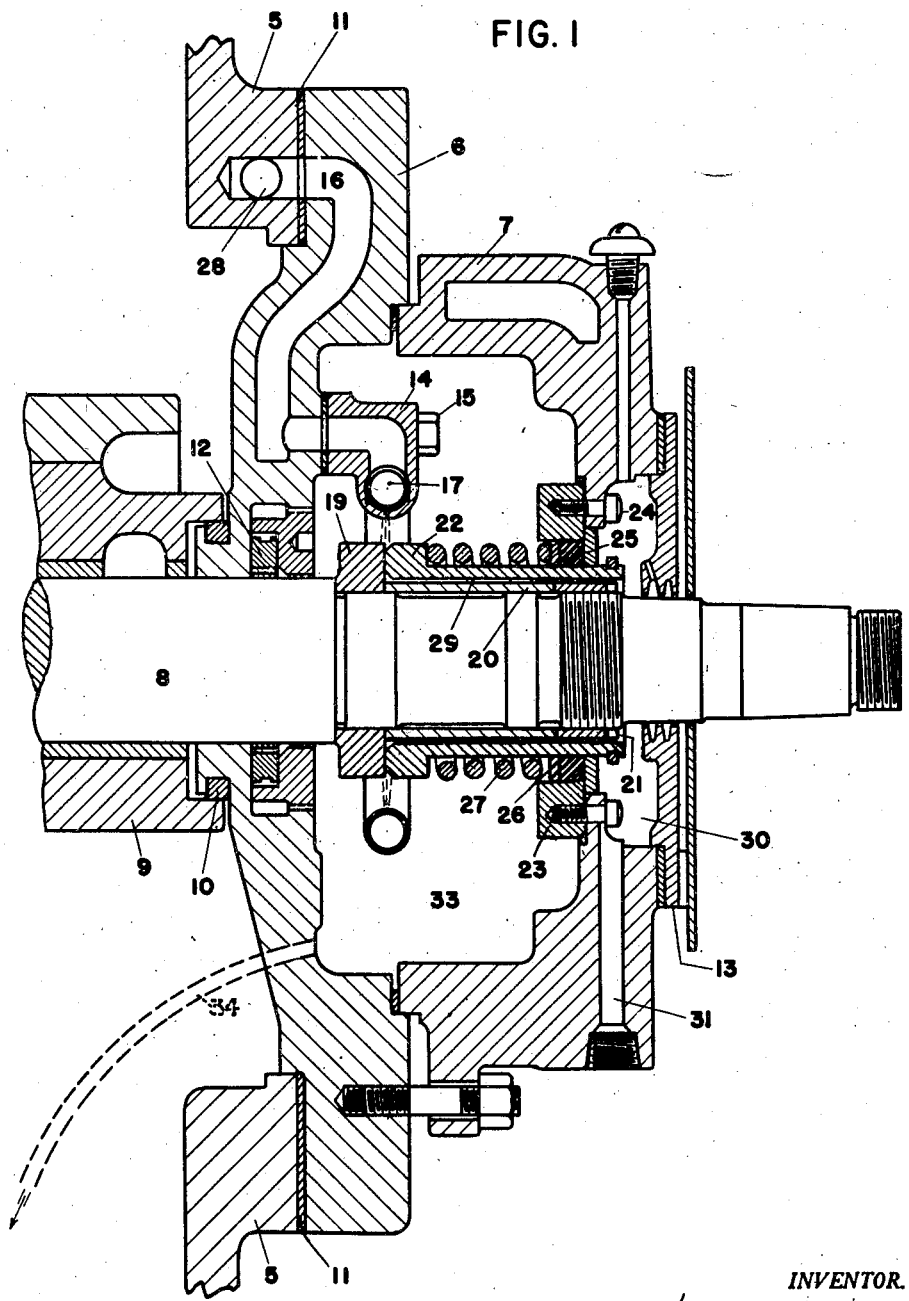
Fig. 1 is a diagrammatic view, in section, of one end of a compressor structure employing applicant's sealing arrangement.

It should be noted that in the arrangement of Fig. 1, as well as that of Fig. 2, the streams of oil from annular distributor 17 are directed at the points of contact between sealing faces so that impact from direct impingement of the oil at the points of contact takes place to a maximum degree.

In the arrangement of Fig. 2, auxiliary sealing ring 32 may readily be replaced, should this be deemed desirable in the event any imperfection exists which diminishes the effectiveness of contact between the engaging faces. In addition, applicant may employ materials having desired characteristics in auxiliary sealing ring 32 so that the ring, itself, may not be of the same hardiness as the contacting faces of ring 19 and sleeve 22, if this is desirable. Thus, such wear as will occur will in greater measure occur in ring 32 rather than in the abutting faces of the permanently installed elements.

In Fig. 4, applicant illustrates one method of assuring the maintenance of a predetermined pressure in the seal chamber, as may be desirable more especially in connection with the arrangement of Fig. 2.

The chamber 33 at the sealing end will have the oil collecting therein drained therefrom through passage 34. A constricting valve 35 is positioned within the casting of seal housing section 6 as shown, and consists of a valve seat 36 whose opening depends upon the pressure of spring 37 bearing against it. Adjusting screw 38 and lock nut 39 enable applicant to vary the setting of the spring so that the valve will open at any desired pressure within practical limits. As a result, the pressure within chamber 33 will be maintained at a desired point, depending upon the setting of valve 35, so that outward pressure, along the shaft toward the end thereof will be maintained and inward leakage of air prevented.

While the use of valves 35 to provide a desired oil pressure in the seal chamber is highly desirable, a comparable result may alternatively be achieved by designing the opening in labyrinth seal 12, so that a desired pressure will be built up in seal chamber 33 with an amount of oil then passing through the labyrinth opening substantially equal to that supplied from manifold 14. The oil flowing through the labyrinth seal will pass into the bearing housing and then be returned for reuse.

Since the invention exemplified by the system disclosed may be practiced with modifications in design of apparatus as well as in the method of operation employed, obvious variations are intended to be covered, and the terms of the appended claims are not intended to be limited to the specific combinations and steps employed.

I claim:
1. An arrangement for assuring a seal about a rotating shaft including a sealing ring mounted on and rotating with the shaft, a sealing sleeve abutting the ring, an annular member substantially surrounding the ring and sleeve at the line of contact therebetween, and means for supplying oil under pressure from a plurality of openings in the annular member to the line of contact between the ring and the sleeve for maintaining a flowing film between the ring and the sleeve.

2. A sealing arrangement for a refrigerant compressor comprising a sealing collar and a sealing ring in contact with one another, said ring being held against a shoulder portion of a shaft whereby said ring and collar rotate with the shaft, a sealing sleeve spaced from the collar, means for preserving a seal between the sleeve and a body portion of the compressor, a floating ring positioned between and in contact with said ring and sleeve, an annular passage between the floating ring and sealing ring, a second annular passage between the floating ring and sealing sleeve, said passages leading to the points of contact between the floating ring and sealing ring, and between the floating ring and sealing sleeve, said sealing sleeve being spaced from the shaft, a tubular annular member positioned about and in close proximity to the floating ring, means for discharging sealing and cooling fluid from the tubular member into the annular passages, and means for withdrawing the fluid except for a minute portion flowing through the space between the sleeve and the shaft.

3. In a sealing arrangement for a rotatable shaft, the combination of a sealing ring mounted on and rotatable with the shaft, a sleeve member disposed adjacent said ring having a surface adapted to abut the ring, yieldable means for urging said sleeve against the ring, an annular member surrounding the sleeve and ring at the line of contact therebetween, said annular member having a plurality of openings formed in its inner surface, the openings extending circumferentially about the line of contact between the sleeve and the sealing ring, and means for supplying sealing and cooling fluid under pressure through said openings to the line of contact between the sleeve and the ring to maintain a flowing film of fluid therebetween.

4. In a sealing arrangement for a rotatable shaft, the combination of a sealing ring mounted on and rotatable with the shaft, a sealing collar abutting the ring and rotatable with the shaft, a sleeve member surrounding the collar and having a surface adapted to abut the ring, said sleeve being spaced from the collar to form a passageway therebetween, yieldable means for urging the sleeve against the ring, an annular member surrounding the sleeve and ring at the line of contact therebetween, said annular member having a plurality of openings formed in its inner surface, the openings extending circumferentially about the line of contact between the sleeve and the sealing ring, means for supplying oil under pressure through said openings to the line of contact between the sleeve and the ring to maintain a flowing film of oil therebetween, a slight amount of fluid passing between the contacting surfaces of the sleeve and ring and seeping into the passageway between the sleeve and the collar, and a collecting chamber adapted to receive oil passing through the passageway.

5. A sealing arrangement according to claim 4 in which the contacting faces of the ring and the sleeve have their peripheral portions spaced from one another to form a recess extending about the line of contact therebetween to receive the oil discharged from the opening in the annular member; the sleeve having a shoulder formed on its exterior surface, and the yieldable means include a spring contacting the shoulder to urge the sleeve against the rotatable sealing ring.

6. A sealing arrangement according to claim 5 in which the arrangement is disposed in a sealing chamber, and a device is provided to regulate withdrawal of oil from the chamber to maintain a desired pressure within the chamber.

7. In a sealing arrangement for a rotatable shaft, the combination of a sealing chamber, a sealing ring in the chamber mounted on and rotatable with the shaft, a sleeve member in the chamber disposed adjacent said ring and having a surface adapted to abut the ring, yieldable means for urging said sleeve against the ring, an annular member in the chamber surrounding the sleeve and the ring at the line of contact therebetween, said annular member having a plurality of openings formed in its inner surface, the openings extending circumferentially about the line of contact between the sleeve and the sealing ring, means for supplying sealing and cooling fluid under pressure through said openings to the line of contact between the sleeve and the ring to maintain a flowing film of fluid therebetween, and means for maintaining a desired pressure within the sealing chamber to prevent inward leakage of air, said means including a drainage line to drain fluid from the chamber, and an adjustable valve in said line set to open at the desired pressure to permit drainage of fluid from the chamber.

8. In a sealing arrangement for a rotatable shaft, the combination of a sealing ring mounted on and rotatable with the shaft, a sealing collar abutting the ring and rotatable with the shaft, a self-lubricating ring disposed about the collar adjacent the sealing ring, a sleeve member surrounding the collar and having a surface disposed adjacent the self-lubricating ring, yieldable means for urging the sleeve against the self-lubricating ring to compress said ring between the sleeve and the sealing ring, an annular member surrounding the sealing ring and the sleeve having openings therein, and means for discharging sealing and cooling fluid under pressure through said openings against the contacting surfaces of the sealing ring and the self-lubricating ring and the contacting surfaces of the self-lubricating ring and the sleeve.

9. A sealing arrangement according to claim 8 in which the contacting surfaces have their peripheral portions spaced from one another to form recesses extending about the lines of contact between the self-lubricating ring and the sleeve.

10. In a sealing arrangement for a rotatable shaft, the combination of a housing containing a sealing chamber through which the shaft extends, a sealing ring disposed in the chamber abutting a shoulder portion of the shaft and adapted to rotate therewith, a collar surrounding the shaft within the chamber abutting the sealing ring and adapted to rotate with the shaft, a sleeve member surrounding the collar and spaced therefrom to form a passageway therebetween, said sleeve having a face contacting the sealing ring, a securing element, a second sealing ring within the securing element and surrounding the sleeve, a gland abutting said second sealing ring, a spring interposed between the gland and a shoulder on the sleeve urging the second sealing ring against the securing element and the sleeve against the first sealing ring, the contacting surfaces of the sleeve and the first sealing ring having their peripheral portions spaced from one another to form a recess extending about the line of contact therebetween, an annular member surrounding the sleeve and the first sealing ring at the line of contact therebetween, said annular member having a plurality of openings formed in its inner surface, the openings extending circumferentially about the line of contact between the sleeve and the sealing ring, means for supplying oil under pressure through the openings to the line of contact between the sleeve and the ring to maintain a flowing oil film therebetween, a slight amount of oil passing between the contacting surfaces of the sleeve and the first sealing ring and seeping into the passageway between the sleeve and the collar, and a collecting chamber adapted to receive oil from the passageway.

LARS HANSON.

REFERENCES CITED

The following references are of record in the file of this patent:

UNITED STATES PATENTS

| Number | Name | Date |
|---|---|---|
| 1,618,655 | Halversen | Feb. 22, 1927 |
| 2,023,206 | Olson | Dec. 3, 1935 |
| 2,133,524 | Baars | Oct. 18, 1938 |
| 2,136,097 | Browne | Nov. 8, 1938 |
| 2,334,548 | Greendee | Nov. 16, 1943 |